United States Patent Office 3,702,260
Patented Nov. 7, 1972

3,702,260
COATED POLYESTER FIBERFILL
Clarence V. Jayne, Gazie K. Ragep, and James D. Templeton, Durham, N.C., assignors to Beaunit Corporation, New York, N.Y.
No Drawing. Filed Jan. 18, 1971, Ser. No. 107,463
Int. Cl. B44d 5/00; D02 1/00
U.S. Cl. 117—100 C    4 Claims

ABSTRACT OF THE DISCLOSURE

Polyester fiberfill having improved compressional recovery is provided comprising crimped polyester staple fiber having cocrystallized on the surface thereof a copolyester comprising about 20 to 95 percent by weight of polyoxyalkylene units and about 80 to 5 percent by weight of ester units identical to those present in the polyester staple fiber substrate. This improved polyester fiberfill is prepared by wet treating uncrimped polyester fiber with the copolyester in order to provide a coating thereon of the copolyester, drawing the treated fiber if not previously drawn, heat treating the coated fiber to fix the copolyester to the fiber surface, crimping the coated fiber and thereafter processing the coated crimped fiber into fiberfill by conventional methods for use as a filler for articles of manufacture, such as pillows, upholstery and the like.

BACKGROUND OF THE INVENTION (1) Field of the invention

This invention relates to surface modified polyester fiberfill products having improved compressional recovery and other outstanding properties and to a method for providing such fiberfill products.

(2) Description of the prior art

Fiberfill products are used in a variety of end products including sleeping and decorative pillows, furniture cushions, insulated wearing apparel, sleeping bags, quilting and the like. The fiberfill material used in the preparation of these various end products must possess a variety of properties or characteristics. They must be lightweight, provide extra warmth, and must possess outstanding initial loft, softness, loft durability, good resilience, thermal insulation, and the like. For example, soft but resilient support or loft is of prime interest in pillows; insulation and warmth qualities are of major importance in quilted housecoats; and in end uses, such as sleeping bags, both warmth and soft, resilient cushioning is desirable and necessary.

Conventional linear, fiber-forming polyesters, such as polyethylene terephthalate, have been found to possess the necessary properties for use in fiberfill applications in place of natural down. The excellent filling power (low weight of fiber per unit volume of space occupied) of polyethylene terephthalate permits the manufacture of light weight products having a high degree of loft, bulk, and warmth. In addition, this filling power is maintained in service due to the exceptionable resilience of polyethylene terephthalate fiberfill so that bulk, loft, support, warmth, and related properties are durable. Polyester fiberfill products have also been found to possess low moisture regain, good mildew resistance, outstanding chemical resistance and resistance to micro-organisms and insects, low boiling water shrinkage, and to be non-allergenic. For the above reasons, polyester short, crimped, staple fibers have found continuous use as fiberfill material in a variety of products, mainly apparel and home furnishings.

SUMMARY OF THE INVENTION

It is the primary object of this invention to provide a modified polyester fiberfill having improved properties over conventional polyester fiberfill products.

Other objects and advantages of the present invention will be apparent from the detailed description which follows.

The objects of this invention are accomplished by providing modified polyester fiberfill for use in various filling applications comprising batts of short crimped polyester staple fiber having cocrystallized on the surface thereof a copolyester comprising about 20 to 95 percent by weight of polyoxyalkylene units and about 80 to 5 percent by weight of ester units identical to those present in the polyester staple fiber substrate.

The modified polyester fiberfill product of this invention is prepared by the following procedure:

(a) wetting polyester fiber with a liquid dispersion, melt or solution of a substantially water insoluble copolyester containing from about 20 to 95 percent by weight of polyoxyalkylene units and from about 80 to 5 percent by weight of crystallizable polyester units present in the surface of the polyester fiber in amounts suitable for durable fixing on the surface of the polyester substrate;

(b) drawing the wetted fiber, if undrawn, so as to dilute the copolyester on the fiber surface to effective concentrations of at least about $2 \times 10^{-8}$ grams of polyoxyalkylene units per square centimeter of the drawn surface;

(c) heating the drawn fiber to relaxation temperatures therefor to durably heat fix effective quantities of the copolyester to the fiber surface and to relax drawing strains;

(d) optionally washing the treated fiber to substantially remove unfixed copolyester and drying or reheating the fiber to refix any looesened copolyester to the fiber surfaces;

(e) crimping the treated fiber; and (f) thereafter processing the crimped treated polyester into fiberfill by cutting the fiber into short staple, and thereafter carding or garnetting the crimped staple into batts.

Bonding resins, such as acrylic type resins, may be applied to the batts to prevent any later fiber leakage and to prevent shifting of the batting in end use applications. The amount of bonding resin used is normally from about 10 to 15 percent of the fiberfill weight.

DESCRIPTION OF THE PREFERRED EMBODIMENTS

The term "fiberfill" as used herein refers to short, crimped fibers which have been carded or garnetted into batts for use as a filler for articles of manufacture, such as pillows, comforters, quilted apparel, bedspreads, upholstery, sleeping bags, and the like. These batts of short, crimped fibers may be bonded or unbonded and are preferably unbonded.

It has been found that conventional polyester fiber, such as polyethylene terephthalate, having cocrystallized on the surface thereof a copolyester comprising about 20 to 95 percent by weight of polyoxyalkylene units and about 80 to 5 percent by weight of ester units identical to those present in the polyester fiber substrate when prepared in a particular manner will provide a fiberfill product having outstanding properties. It has been found that the copolyester should be applied to the polyester fiber prior to crimping and is preferably applied to undrawn polyester fiber. Application of the copolyester to drawn, crimped polyester fiber followed by subsequent heat treatment does not give the marked change in surface characteristics of the fiber that is observed when the copolyester is applied during processing and prior to the crimping operation. It is believed that the reason for this behavior lies in the influence on crimp performance which the copolyester is believed to have. Polyester which is crimped after being treated with the copolyester has a less severe, lower amplitude crimp which contributes to the improvement in compressional recovery obtained. The application of the copolyester to undrawn polyester is preferred due to a greatly reduced tendency of the resulting fiberfill to clump and matt. In any event, the surface and crimp characteristics of the copolyester treated fiber provides a fiberfill product which maintains its bulk after prolonged compression. The novel products of this invention are also advantageous in that the improvement in compressional recovery is achieved without stiffening the fiber. The modified polyester fiberfill of this invention is actually softer than the conventional polyester fiberfill.

The polyester fiber substrate useful for the purposes of this invention may be any conventional polyester such as are disclosed in U.S. Pat. 2,465,150. Exemplary of such polyester compositions are polyethylene terephthalate, polytetramethylene terephthalate, poly(1,4-bismethylene cyclohexane terephthalte), poly(ethylene-naphthalane-2,4-dicarboxylate) and poly(ethylene-phenoxyethane-4,4'-dicarboxylate), and other such phenoxyalkane polymers.

In addition, the aforesaid polyesters may be used wherein adipate, sebacate, isophthalate, sulfoisophthalate, p-oxybenzoate or p-oxyethoxy-benzoate groups may, wholly or in part, replace the terephthalate or other carboxylate groups or wherein oxydiethylene or polyoxyethylene groups may, in part, replace the alkylene groups in the aforesaid polyesters. Copolyesters of the aforesaid polyesters with one another also may be used. Preferred among the fiber-forming polyesters for instant practice are polyethylene terephthalate, its copolymers with the aforesaid polyesters wherein the polyethylene terephthalate portions represent at least 50 percent by weight of the copolymer and poly(1,4-bismethylene cyclohexane terephthalate).

In the practice of the present invention, the copolyesters used to coat the aforesaid polyester fiber substrates contain crystallizable polyester units in percentages of from about 5 to 80 percent by weight, which units chemically are defined by the crystallizable ester repeating units present in the polyester fiber substrate. The remainder of the copolyester contains from about 95 to 20 percent by weight polyoxyalkylene units as hereinafter defined.

Useful copolyesters for the purposes of this invention may be prepared by esterification or transesterification of appropirate polyoxyalkylene glycols, e.g. having a molecular weight from about 300 to 15,000, with appropriate dicarboxylic acids and/or their diesters, such as terephthalic acid or dimethyl terephthalate, and with appropriate glycols having chemical units identical to the repeating units in the fiber, such as polyethylene glycol or ethylene glycol, and then by condensation copolymerization of the alcoholic and/or ester reaction products. Alternate methods known to the art for providing copolyesters useful to the present invention may also be used.

The polyoxyalkylene units that form a critical part of the copolyesters useful in this invention have the structure of the corresponding polyoxyalkylene glycols used in the preparation of the coating copolyesters minus a terminal H and a terminal OH, viz.

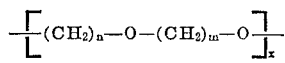

thus yielding a polyoxyalkylene unit molecular weight of that of the corresponding polyoxyalkylene glycol minus 18. Exemplary of suitable hydrophilic polyoxyalkylene units are those derived from corresponding polyoxyalkylene glycols, such as the glycols of polyoxyethylene, polyoxypropylene, polyoxytrimethylene, polyoxybutylene and their copolymers.

In general, polyoxyalkylene unit weights that are useful herein may range from about 282 to just less than that of the molecular weight of the polyester molecules in the polyester substrate to be coated. The preferred range of polyoxyalkylene unit molecular weights is from about 600 to 15,000 with the most preferred range being from about 2,000 to 6,000.

The copolyester treating composition is preferably applied to the polyester fiber while it is in the undrawn or amorphous state. A convenient means for applying the copolyester is to pass the undrawn polyester fiber through a liquid bath containing the copolyester, either in solution with a nonreactive solvent therefor, which liquid also is a very poor solvent for the fiber, or in uniform dispersion in some nonreactive liquid which is a very poor solvent for both the copolyester and the polyester fiber, such as water, or as a melt of the copolyester. The use of aqueous dispersions are preferred. When a dispersion is used, preferred practice dictates that the copolyester particles be quite small in size for easy and lasting uniform dispersion to give a more uniform coating on the fiber, and to make greater amounts of particle surface area per unit weight of copolyester available for fixing. This permits large numbers of molecules at the copolyester particle surfaces to contact large numbers of fiber surface molecules and thus subsequently to be easily fixed to the fiber surface in great numbers per unit weight of copolyester. It has been found that copolyester particle sizes of one or less microns in length are adequate for this purpose.

Suitable concentrations of copolyester, when used in solution or dispersion, may range from about 0.1 to 50 percent by weight with the preferred range being from about 1 to 20 percent by weight. To insure the desired uniform coating of the fiber, we have found that fiber wet pick-up, that is to say the weight of copolyester solution, dispersion or melt added to the fiber, may usefully range from about 0.5 to 200 percent depending upon the concentration of the copolyester therein and the mol and weight units present in the copolyester, with a preferred range of about 5 to 100 percent by weight wet pick-up. The most preferred range is about 10 to 20 percent by weight pick-up. Other means also may be used to wet the fiber with copolyester, such as padding, spraying, or melt flowing the copolyester thereon. Bath application is preferred to insure uniform coating.

The copolyester coated polyester filaments, if undrawn, are then drawn at a draw ratio of 2/1 to 10/1 of drawn fiber length to undrawn fiber length so as to provide a polyoxyalkylene concentration of at least $2\times10^{-8}$ grams per square centimeter of surface of the polyester and preferably to provide a polyoxyalkylene concentration of from about $2\times10^{-8}$ to $4\times10^{-5}$ g./cm.$^2$ of surface of the polyester. Either cold or hot drawing may be used, a preferred range for the latter being from about 50 to 260° C. with a most preferred range being about 80 to 110° C.

In order to produce a durable surface treatment it is necessary to heat the coated polyester filament at a temperature and for a time sufficient to cause cocrystallization to take place between the copolyester and the polyester. A heat treatment in the range of from about 80° C. to just below the melting point of the polyester composition for a time sufficient to cause cocrystallization to take place has been found to be satisfactory. It has been found that a heat treatment at a temperature of about 100° C. to 180° C. for a period of from about 3 to 5 minutes provides very satisfactory results.

If desired the filament may then be washed, preferably with water, to remove any of the unfixed or loose copolyester treating composition. The removal of unfixed copolyester material aids in the mechanical processing of the treated filaments into fiberfill. Water and inert aqueous solutions or dispersions are suitable for use in the washing step and may be applied to the filament by means of a bath, spray or any other convenient method. The filaments are preferably dried by heat (110 to 250° C.) treatment after the washing to refix any remaining loosened copolyester coating.

The copolyester coated polyester filaments are then crimped using conventional techniques and processed to give short staple fiber, i.e. 2 inch length, by cutting, shredding or tearing the filament into short lengths. The short, crimped staple fibers are then carded or garnetted into fiber-fill batts for use as a filler for articles of manufacture, such as pillows, comforters, quilted apparel, bedspreads, upholstery, sleeping bags, and the like, using conventional techniques.

Bonding resins, such as acrylic type resins, may be applied to the batts to prevent any later fiber leakage and/or to prevent shifting of the batting in end use applications. The amount of bonding resin used is normally from about 10 to 15 percent of the batt weight and is applied by spraying on both sides of the surface in the form of water emulsions, followed by drying and curing.

In the preparation of the fiberfill products of this invention, conventional modifying agents, such as delustrants, anti-oxidants, plasticizers, stabilizers, and the like may be incorporated in the polyester fiber and/or the copolyester coating compositions.

In the preparation of the copolyesters useful in coating a polyethylene terephthalate fiber, suitable quantities of ethylene glycol, terephthalic acid or ester forming derivatives thereof, and a polyoxyethylene glycol are reacted under conventional esterification and polymerization conditions and using conventional techniques until a crystallizable product is obtained. The copolyesters so obtained are meltable, water insoluble and water dispersable white waxy solids. The aforesaid solid products are preferably comminuted to particle sizes of about 1 or less micron and dispersed in water or some nonreactive inorganic or polar organic liquid to provide dispersions useful in accordance with this invention.

A preferred procedure for the preparation of the surface modified polyester fiberfill products of this invention would be to disperse a copolyester having an intrinsic viscosity of about 0.7 (as measured in an 0.4 percent solution in trifluoroacetic acid at about 30° C.) as comprising about 60 to 90 percent by weight of polyoxyethylene terephthalate groups which have been derived from a polyoxyethylene glycol of average molecular weight of 1000 to 4000 and about 40 to 10 percent by weight of ethylene terephthalate units in water to provide about a 5 to 20 percent solids dispersion at about 40 to 60° C. This dispersion is then diluted to provide a dispersion of about 0.1 to 5.0 percent by weight solids which is applied to the surface of undrawn polyethylene terephthalate filaments. The treated filaments are then drawn at a draw ratio of about 2/1 to 10/1 and crimped. The filaments are then heated at a temperature of about 100 to 180° C. for about one second to 5 minutes to attain a durable coating of the treating composition upon the filaments, said coating being sufficient to provide a polyoxyalkylene concentration of at least $2 \times 10^{-8}$ g./cm.$^2$ of surface of the treated filaments and preferably a polyoxyalkylene concentration of from about $2 \times 10^{-8}$ to $4 \times 10^{-5}$ g./cm.$^2$ of surface of the treated article. The treated filaments are then cut into 2 inch staple fiber and processed into fiber-fill battings using conventional and well known methods.

The following examples are used to illustrate the present invention and are not intended to limit it in any way. Unless otherwise noted percentages as expressed in the examples indicate percent by weight.

The percent recovery and percent compressibility figures given in each of the examples was measured as follows: A specimen (20 square inches) of each fiberfill product was compressed under a load of five pounds per square inch for one minute. The load was removed and the specimen was allowed to recover for five minutes. The specimen was then subjected to a load of 0.1 pound per square inch for 30 seconds. The thickness of the specimen was determined before and after compression at a load of 0.01 pound per square inch and percent recovery was determined from a ratio of thickness before and after compression. Percent compressibility was determined from a ratio of the original thickness of the specimen as opposed to its final thickness.

EXAMPLE 1

A drawn, crimped polyethylene terephthalate tow of about 200,000 denier was cut into 2 inch staple fiber and carded to form a fiberfill product. This fiberfill product was found to have a percent recovery of 59.93 and a percent compressibility of 6.3.

EXAMPLE 2

A drawn, crimped polyethylene terephthalate tow of about 200,000 denier was passed through an aqueous dispersion containing 1.4 percent solids containing a copolyester comprising about 25 percent by weight of ethylene terephthalate units and about 75 percent by weight of polyoxyethylene units of a molecular weight of about 3000 to provide a wet pickup of about 20 percent. The treated tow was then heated at a temperature of 150° C. for 5 minutes to fix the copolyester on the surface of the tow. The tow was cut into 2 inch staple fiber and carded to form a fiberfill product. This fiberfill product was found to have a percent recovery of .63.52 and a percent compressibility of 62.9.

EXAMPLE 3

An undrawn polyethylene terephthalate tow was passed through an aqueous dispersion containing 1.4 percent solids comprising about 25 percent by weight of ethylene terephthalate units and about 75 percent by weight of polyoxyethylene units of a molecular weight of about 3000 to provide a wet pickup of about 20 percent. The treated tow was then drawn at a temperature of 100° C. under a drawn ratio of about 5 to 1 and the drawn tow heated at a temperature of 100° C. for 5 minutes to fix the copolyester on the surface of the tow. The treated tow was then crimped using conventional means, cut into 2 inch staple and carded to form a fiberfill product. This fiberfill product was found to have a percent recovery of 73.87 and a percent compressibility of 50.9.

Using the pre-draw treatment as disclosed in this example, greatly improved compressional recovery is obtained in the resulting fiberfill product. There is a 23.0% increase in percent recovery and a 23.2% increase in percent compressibility over conventional polyester fiberfill products and a 16.3% increase in percent recovery and a 19.1% increase in percent compressibility over the modified polyester fiberfill product where the copolyester was applied to a drawn, crimped tow. In addition, the pre-draw treated fiberfill product processed much better and showed a greatly reduced tendency to clump and matt. In addition, these improvements are obtained without stiffening the resulting product as the modified fiberfill product of this invention is softer and has a better handle than the conventional fiberfill product.

It is to be understood that changes and variations may be made from the foregoing embodiments of the present invention without departing from the spirit and scope thereof as defined in the appended claims.

What is claimed is:

1. A polyester fiberfill product having excellent compression recovery comprising short, crimped polyester fibers having cocrystallized on the surface thereof a thin coating of a copolyester comprising about 5 to 80 percent by weight of polyester units chemically identical to those of said fiber and about 95 to 20 percent by weight of polyoxyalkylene units, said copolyester coating having been cocrystallized on the surface of the polyester fiber prior to the crimping of the fiber.

2. A polyester fiberfill product as defined in claim 1 wherein the copolyester coating is present on the surface of the polyester fibers in an amount sufficient to provide at least $2 \times 10^{-8}$ grams of polyoxyalkylene units per square centimeter of fiber surface.

3. A polyester fiberfill product as defined in claim 1 wherein the copolyester coating is present on the surface of the polyester fibers in an amount sufficient to provide from above $2 \times 10^{-8}$ to $4 \times 10^{-5}$ grams of polyoxyalkylene units per square centimeter of fiber surface.

4. A polyester fiberfill product as defined in claim 1 wherein the polyester fibers are comprised of polyethylene terephthalate and the copolyester coating is comprised of ethylene terephthalate units and polyoxyethylene units.

References Cited

UNITED STATES PATENTS

| | | | |
|---|---|---|---|
| 3,118,750 | 1/1964 | Dunlap et al. | 161—273 X |
| 2,465,150 | 3/1949 | Dickson | 260—75 |
| 2,155,067 | 4/1939 | Ubbelholde | 161—273 |
| 2,968,857 | 1/1961 | Swerdloff et al. | 161—273 |
| 3,038,235 | 6/1962 | Zimmerman | 161—273 |
| 3,034,920 | 5/1962 | Waller et al. | 117—138.8 |

WILLIAM D. MARTIN, Primary Examiner

M. R. P. PERRONE, Jr., Assistant Examiner

U.S. Cl. X.R.

117—138. F, 161 UC: 161—176